Sept. 16, 1952 P. M. BRISTER 2,610,986
LIQUID RECOVERY APPARATUS
Filed March 31, 1949
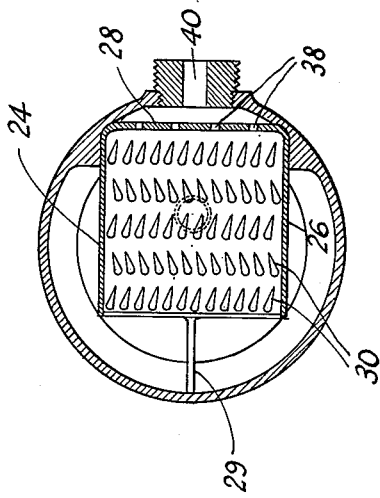
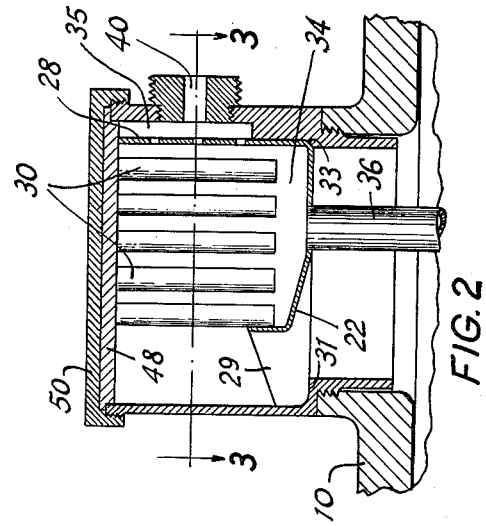
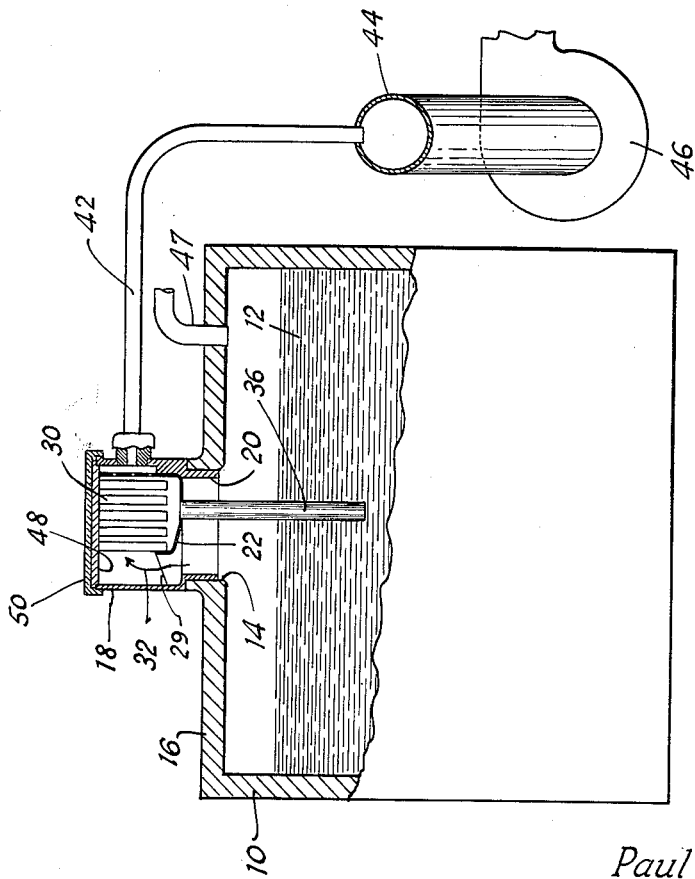
INVENTOR.
Paul M. Brister
BY
ATTORNEY Patented Sept. 16, 1952

2,610,986

UNITED STATES PATENT OFFICE 2,610,986

LIQUID RECOVERY APPARATUS

Paul M. Brister, Madison, N. J., assignor to The Babcock & Wilcox Company, New York, N. Y., a corporation of New Jersey Application March 31, 1949, Serial No. 84,506

10 Claims. (Cl. 136—180)

1

This invention relates to liquid recovery apparatus, and in its more specific aspects to the recovery of liquid electrolyte particles which are involved as carry-over in the purging of storage batteries by the movement of air or other gas over the surface of the electrolyte.

In the charging of a battery of the storage type in which a gas or vapor may be evolved during a phase or phases of the charging process, the gas or vapor upon release at the surface of the electrolyte may carry with it small droplets of the electrolyte. Movement of the gas released at the surface of the electrolyte to some position exterior to the battery either by natural convection or diffusion or by purging the battery with some gas or vapor, causes the loss of the electrolyte droplets carried in the gas stream. The operation of a purging system serves to remove the liberated gases and vapors so as to reduce the hazard present in the case of explosive or toxic gases and will to some extent facilitate cooling in the battery.

Electrolyte loss otherwise consequent to the operation of a purging system is minimized by the present invention which involves means for continuously separating entrained liquid particles and returning them to the body of the electrolyte within the battery during the operation of the system.

The invention is particularly adapted for advantageous use where a large number of storage batteries are used in confined quarters, as in submarines. Here, space is at a premium and sufficient free space above the electrolyte in the batteries could not be provided for gravity separation of liquid particles from the electrolyte. It is also particularly desirable in submarine use that the gases given off from the batteries during the charging periods, should be effectively removed from the batteries and discharged to a position exteriorly of the vessel.

More specifically the invention involves a battery attachment disposed above the body of the electrolyte and connected into a purging system which causes gases or vapors from the batteries to pass through the attachment. The attachment is provided with an interior construction which causes the suspended liquid particles to be separated from the vapor or gas and to be accumulated or agglomerated for gravity return to the body of the electrolyte.

For a clear understanding of the invention reference should be had to the accompanying drawings in which a preferred embodiment of the invention is disclosed.

2

In the drawings:

Fig. 1 is a diagrammatic view showing a vertical section of the storage battery with the illustrative attachment secured to the battery at its vent opening above the electrolyte;

Fig. 2 is an enlarged vertical section of the battery attachment; and

Fig. 3 is a horizontal section on the line 3—3 of Fig. 2, showing the arrangement of airfoil separator elements.

In Fig. 1 there is shown a battery having a box or container 10 with a body of liquid electrolyte 12 therein. The battery is also provided with spaced plates at least parts of which are submerged in the body of the electrolyte as is well-known in the art. These plates are of two kinds, positive and negative, arranged in alternation and spaced apart by interposed electrically non-conductive members.

Connected to the vent opening 14 in the top 16 of the storage battery container, there is an attachment which includes a shell 18 having a downward projection 20 fitted within the opening in the manner shown. This shell is provided with a diaphragm 22, the lower part of which is transversely disposed with reference to the shell 18. This diaphragm is also integral with upright parallel walls 24 and 26 (Fig. 3), which combine with the forward wall 28 to provide a separator chamber in which there are disposed five transverse rows of air foil separator elements such as those indicated at 30. The diaphragm 22, with the associated walls 24, 26, and 28 and flange 29 form a casing fitted within the shell 18 and seated on the shoulders 31 and 33. This casing opens at its end opposite the wall 28 for the flow of gases and suspended liquid particles in the direction of the arrow 32, to the airfoil elements.

The airfoil elements 30 are arranged at an acute angle to the general direction of the approaching fluid flow to develop low pressure areas of liquid separation on the shadowed sides of the separators for providing zones in which the liquid particles will separate from the gases. These liquid particles (which may constitute .0147% by weight of the gas and liquid stream) gather and accumulate upon the airfoil elements and run down along those elements to the space 34 below them and above the diaphragm 22 which constitutes the bottom of a pan-like construction at the lower part of the separator casing. From this space they pass through a drain pipe 36 which has its lower end beneath the body of the electrolyte within the storage battery.

The gas or vapor from which the liquid has been freed, passes through openings 38 in the forward wall 28 of the separator casing, through the equalizing chamber 35, and then through opening 40 and through an attached conduit 42 to a header 44 which is connected to the inlet of a fan 46 for causing the gas or vapor to be removed from the vicinity of the battery. A typical gas velocity through the opening or outlet 40 is 300 feet per minute, at 8 cfm.

An air inlet 47 communicates with the battery space above the electrolyte 12 to provide for the effective operation of the above described system.

The airfoil elements 30 may be secured and depend from an inner cover plate 48 which is seated on the top of the shell 18. Fig. 3 shows an additional cover 50 which is secured in gas tight contact around the plate 48 and the top of the shell 18.

The airfoil separator elements are arranged in successive rows extending transversely of the flow of gas and liquid mixture. Each element has its downstream face disposed at such an acute angle to the general direction of the approaching fluid flow that downstream vortex zones of lower pressure are created for the separation and accumulation of the liquid component.

Considering the angle of incidence as being the angle made by the major transverse axes of the separator elements with the general direction of approaching fluid flow, this angle may vary in the range of 16–27°, but maximum effectiveness has been found to result from an arrangement wherein the angle of incidence is of the order of 22½°.

The airfoil type separator elements are of tapering cross-section with their portions of maximum thickness near their edge portions confronting the oncoming fluid. These portions may be said to have laminar flow curvature, and the separator elements are so constructed and arranged that the above indicated vortex separating zones are bordered by zones of laminar flow between successive elements.

It is to be noted that the drawing shows the angle of incidence of each of the airfoil elements of the second, fourth, sixth, etc. rows to be the opposite of the incidence angle of each of the elements in the immediately preceding row.

All of the above described parts of the illustrative battery attachment are made of a corrosion resistant material, such as hard rubber, which may be molded in the shapes shown and described. It is important to have the airfoil separator elements made of a material which will not be corroded or pitted inasmuch as the separating efficiency of those elements depends upon the maintenance of their originally smooth surfaces.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. In combination, a storage battery provided with an opening above its liquid electrolyte, a shell having an inlet fitting within said opening, the shell having a gas outlet for communication with gas moving means, said inlet being spaced from said outlet, a liquid and gas separator including rows of spaced liquid separator elements of airfoil type cross section disposed between said inlet and outlet and across the path of fluid moving to the outlet, and liquid discharge means including a pipe having its inlet communicating with the space below said separator elements for returning the accumulated liquid to the electrolyte of the battery, said separator elements being set obliquely to the general direction of fluid flow to said outlet.

2. A storage battery attachment comprising, in combination, a shell adapted to be seated over an opening of the battery, said shell being provided at one position with a gas outlet, means within the shell providing an inlet adapted for communication with the space above the electrolyte of a battery, a liquid and gas separator including a plurality of separator elements of airfoil type cross section fixed within the shell at a position between said inlet and said outlet, and liquid draining means disposed beneath the level of the separator elements and adapted to direct separated liquid to a position within a battery, said airfoil type separator elements extending upwardly from said draining means across the flow path of a liquid and gas mixture flowing through the shell and arranged with their minor axes obliquely disposed to the general direction of said flow path.

3. In a storage battery attachment, a shell having an inlet adapted to be placed in communication with the gas vent opening of a storage battery and having a gas outlet, a plurality of successive transverse rows of spaced upright separator elements of airfoil type cross-section disposed across the flow of a gas and liquid mixture from said inlet to said outlet, said elements being disposed with their downstream faces at such an acute angle to the general direction of approaching fluid flow that downstream vortex zones of lower pressure are created for the separation of a liquid component, said vortex zones being bordered by zones of laminar flow in the spaces between successive transverse elements, said elements in each row also being of tapering cross-section with their portions of maximum thickness near their edge portions confronting the oncoming fluid stream, the elements of successive rows alternating with opposite angular relations to the general direction of approaching fluid flow, and means including a pan-like construction and connected drain pipes disposed beneath the separator elements to accumulate and to direct the separated liquid from said separator elements back to the electrolyte of the battery.

4. A liquid recovery attachment adapted to be connected to an opening above the electrolyte of a storage battery and comprising in combination, a shell which is in communication with the storage battery space above the electrolyte, and means forming a gas outlet of the shell at a position remote from the point of communication between the shell and the space above the battery electrolyte, fluid moving means for causing a flow of fluid from such space through the shell and its outlet to a remote position, liquid and gas separating means including upright airfoil elements spaced in rows arranged transversely of said fluid flow and disposed within the shell between its gas outlet and its inlet communicating with said storage battery space, and a liquid accumulating and draining construction disposed within the shell and beneath said airfoil elements and adapted to communicate with the electrolyte space of a battery.

5. A liquid recovery attachment adapted to be connected to a storage battery at an opening above the electrolyte of the battery and comprising in combination, a shell having an inlet adapted to be placed in communication with a storage battery space above the battery electrolyte, means forming a gas outlet of the shell at a position remote from said inlet, fluid moving means for causing a flow of a gas and liquid mixture from such space through the shell and its outlet to a remote position, airfoil gas and liquid separator elements spaced in rows arranged transversely of said mixture flow from said inlet to said outlet, said separator elements extending from a position at the lower part of said flow to a position at a higher level, and means out of the path of said mixture flow to accumulate the separated liquid and return it to the electrolyte of the battery.

6. A liquid recovery attachment adapted to be connected to an opening above the electrolyte of a storage battery and comprising in combinattion, a cylindrical shell having an inlet adapted to be placed in communication with a storage battery space above the battery electrolyte, said shell also having a gas outlet at a position remote from said inlet, a casing removably fitted within the shell and having integral therewith a plurality of rows of spaced gas and liquid separator elements of airfoil type transverse cross-section disposed so as to extend upwardly across the path of fluid flow from said inlet to said outlet, the casing presenting liquid accumulating chamber elements and liquid draining means below said elements, said last named means adapted to communicate with the body of the liquid electrolyte within the battery, and a fluid-tight cover for said shell.

7. In a storage battery attachment; a shell of corrosion resistant molded material having an inlet adapted to fit within a storage battery opening; the shell also formed with a fluid outlet remote from said inlet adapted to communicate with the inlet of a fan of a battery purging system, a casing removably fitted within the shell and provided with walls and a base providing a separator chamber, said casing also having an inlet communicating with the shell inlet and an outlet communicating with the shell outlet, a plurality of rows of laminar flow separator elements of airfoil type cross-section disposed in fixed upright positions within said casing at an attack angle to a fluid flow from the casing inlet to its outlet within the range of 15–27°, said casing also providing a pan-like liquid accumulating construction and a liquid drain below the lower ends of the separator "elements," and a fluid tight cover for said shell.

8. A liquid recovery attachment for an electric storage battery including a shell having a fluid inlet adapted to be connected to the gas vent opening above the electrolyte of the battery, the shell also having a gas outlet for connection with a purging system causing gas to flow from the battery vent through the shell, spaced gas and liquid separator elements of airfoil type secured within the shell and disposed within the path of gas flow through the shell, said elements providing for the flow of separated liquid out of the gas flow path, and liquid draining means beneath the separator elements receiving the liquid separated by said elements and returning it to the electrolyte without counter-current flow of the returning liquid relative to the gas flow and without contact between the gas and the separated fluid.

9. A liquid recovery attachment for an electric storage battery including a shell having a fluid inlet adapted to be connected to the gas vent opening above the electrolyte of the battery, the shell also having a gas outlet for connection with a purging system causing gas to flow from the battery vent through the shell, a removable shell cover member, spaced gas and liquid separator elements of airfoil type secured to and depending from the cover member and normally disposed within the path of gas flow through the shell, said elements providing for the flow of separated liquid out of the gas flow path, and means receiving the liquid separated by said elements and returning it to the electrolyte without counter-current flow of the liquid relative to the gas flow.

10. A liquid recovery attachment for an electric storage battery including a shell having a fluid inlet adapted to be connected to the gas vent opening above the electrolyte of the battery, the shell also having a gas outlet for connection with a purging system causing gas to flow from the battery vent through the shell, spaced gas and liquid separator elements of airfoil type removably secured as a unit within the shell and disposed within the path of gas flow through the shell, said elements providing for the flow of separated liquid out of the gas flow path, and means receiving the liquid separated by said elements and returning it to the electrolyte without counter-current flow of the liquid relative to the gas flow.

PAUL M. BRISTER.

REFERENCES CITED

The following references are of record in the file of this patent:

UNITED STATES PATENTS

| Number | Name | Date |
|---|---|---|
| 1,363,648 | Hubbard | Dec. 28, 1920 |
| 1,583,021 | Snyder | May 4, 1926 |
| 1,920,261 | Lavender | Aug. 1, 1933 |
| 2,480,861 | Jaworski et al. | Sept. 6, 1949 |

FOREIGN PATENTS

| Number | Country | Date |
|---|---|---|
| 310,905 | Germany | Feb. 27, 1919 |
| 323,911 | Itlay | Jan. 12, 1935 |
| 326,972 | Germany | Oct. 5, 1920 |
| 611,798 | France | July 17, 1926 |